(12) United States Patent
Maniere

(10) Patent No.: US 11,519,274 B2
(45) Date of Patent: Dec. 6, 2022

(54) CHANNELING FURROW UPSTREAM OF A BLADE

(71) Applicant: SAFRAN AIRCRAFT ENGINES, Paris (FR)

(72) Inventor: Vianney Christophe Marie Maniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/269,742

(22) PCT Filed: Aug. 19, 2019

(86) PCT No.: PCT/FR2019/051937
§ 371 (c)(1),
(2) Date: Feb. 19, 2021

(87) PCT Pub. No.: WO2020/039142
PCT Pub. Date: Feb. 27, 2020

(65) Prior Publication Data
US 2021/0254470 A1 Aug. 19, 2021

(30) Foreign Application Priority Data
Aug. 20, 2018 (FR) ...................................... 1857540

(51) Int. Cl.
*F01D 5/14* (2006.01)
*F01D 9/04* (2006.01)

(52) U.S. Cl.
CPC ............. *F01D 5/143* (2013.01); *F01D 9/041* (2013.01); *F05D 2220/323* (2013.01); *F05D 2250/16* (2013.01); *F05D 2250/184* (2013.01)

(58) Field of Classification Search
CPC . F01D 5/14; F01D 5/141; F01D 5/142; F01D 5/143; F01D 5/145; F01D 9/02;
(Continued)

(56) References Cited

U.S. PATENT DOCUMENTS

2006/0032233 A1* 2/2006 Zhang ................... F01D 9/023
60/782
2008/0050223 A1* 2/2008 Liang ................... F01D 9/065
415/176

(Continued)

FOREIGN PATENT DOCUMENTS

DE 1937 395 A1 2/1971
EP 2 713 013 B1 8/2016
JP 55-69703 A 5/1980

OTHER PUBLICATIONS

Search Report dated Apr. 9, 2019 from the French Intellectual Property Office in FR Application No. 1857540.
(Continued)

*Primary Examiner* — Eldon T Brockman
*Assistant Examiner* — Elton K Wong
(74) *Attorney, Agent, or Firm* — Sughrue Mion, PLLC

(57) ABSTRACT

The invention relates to an assembly for a turbomachine (1) extending about an axis (X) comprising: —an inner annular platform (13) and an outer annular platform (14) delimiting a flow channel (3) for a flow flowing from upstream to downstream, and —at least one fixed blade (12) extending radially between the inner annular platform (13) and the outer annular platform (14), said fixed blade (12) being profiled with a leading edge (15), characterized in that the inner annular platform (13) and/or the outer annular platform (14) comprises, upstream of the leading edge (15) of the fixed blade (12), a furrow (21) for channeling the fluid flowing in the channel (3), having a segment forming an upstream limit (22) and a segment forming a downstream limit (23), the length of the upstream limit (22) being greater than the length of the downstream limit (23).

9 Claims, 3 Drawing Sheets

(58) Field of Classification Search
CPC ........ F01D 9/04; F01D 9/041; F05D 2250/16;
F05D 2250/184; F05D 2220/323; F05D
2240/121; F05D 2240/80
See application file for complete search history.

(56) References Cited

U.S. PATENT DOCUMENTS

| | | | |
|---|---|---|---|
| 2014/0090380 A1* | 4/2014 | Aggarwala | F04D 29/681 |
| | | | 416/189 |
| 2016/0115972 A1* | 4/2016 | Taylor | F04D 29/324 |
| | | | 416/189 |
| 2018/0171808 A1* | 6/2018 | Correia | F01D 9/041 |

OTHER PUBLICATIONS

International Search Report dated Dec. 18, 2019 from the International Searching Authority in International Application No. PCT/FR2019/051937.

* cited by examiner

CHANNELING FURROW UPSTREAM OF A BLADE

CROSS REFERENCE TO RELATED APPLICATIONS

This application is a National Stage of International Application No. PCT/FR2019/051937 filed Aug. 19, 2019, claiming priority based on French Patent Application No. 1857540 filed Aug. 20, 2018, the entire contents of each of which are herein incorporated by reference in their entireties.

GENERAL TECHNICAL FIELD AND PRIOR ART

The present invention generally relates to flow channeling devices in turbines or compressors, particularly when these turbines or compressors include several stages and include one or more nozzles or straighteners.

The field of application of the invention is in particular that of turbomachines equipping aircraft engines.

The invention is applicable, however, to turbines or compressors dedicated to other types of use.

With reference to FIG. 1, a turbomachine 1 extending along an axis X conventionally includes, from upstream to downstream following the direction of flow of the fluids in the turbomachine 1, a fan 2 propelling a flow of air in a flow channel 3, one or more compressors 4 including one or more rows of movable blades 5, or compressor rotor, alternating with rows of fixed blades 6 or straightener, a combustion chamber 7, a turbine 8 including one or more rows of movable blades or turbine rotor 9 alternating with one or more rows of fixed blades or nozzle 10, and an exhaust 11.

During the operation of the turbomachine 1, the rotation of the compressor rotor 5 or of the turbine rotor 9 modifies the flow direction of the gas flow in the flow channel 3, which has the effect of reducing the angle of attack of the flow on the rows of movable blades positioned downstream, and therefore the effectiveness of these downstream rows of movable blades.

In order to counter this effect, rows of fixed blades 6, 10 are located between the rows of movable blades 5, 9, the profile of these fixed blades 6, 10 being configured to redirect the flow of fluid in the turbomachine 1, in order to re-establish axial flow before each row of movable blades 5, 9.

With reference to FIG. 2, these rows of fixed blades 6, 10 conventionally include blades 12 held in position between a radially inner annular platform 13 and a radially outer annular platform 14.

Depending on the phases of operation of the turbomachine 1, the speed of rotation of the rotors of the compressor 5 and of the turbine 9 can vary, and therefor increase or decrease the angle of attack of the flow of air relative to the rows of fixed blades 6, 10, reducing their effect and therefore degrading the performance of the turbomachine 1.

It is known from the prior art to resort to straighteners 5 or nozzles 9 with variable pitch, allowing compensating the variation of the angle of attack of the flow by modifying the pitch of the blades 12 of the straighteners 5 or of the nozzles 9.

These solutions are constraining, however, particularly from the point of view of bulk, of the weight of the device, of the complexity of assembly, of the lifetime and the maintenance of the movable parts.

When the architecture of the engines does not allow the adaptation of this type of solution, a fixed pitch of the blades 12 of the straightener 5 or nozzle 6 is configured so as to offer a compromise supplying a flow angle of attack relative to the blades 12 that is optimized for the key operating points.

These compromises do not however allow attaining optimal performance of the turbomachine 1 for all operating speeds, and therefore impose a structural limit to the efficiency of the engine.

GENERAL PRESENTATION OF THE INVENTION

One object of the invention is to channel the flow upstream of the straighteners or nozzles with fixed pitch so as to present an optimal angle of attack to the straightener or nozzle.

Another object of the invention is to improve the efficiency of the turbomachine, thus allowing a reduction of its fuel consumption.

Another object of the invention is to limit the disparities of efficiency due to the different operating speeds of the turbomachine.

Another object of the invention is to increase the maximum operating speed of the turbomachine.

Another object of the invention is to keep the aerodynamic performance of the flow stream identical to those of a smooth stream.

Another object of the invention is to contain the weight of the device.

Another object of the invention is to minimize the costs of maintenance by reducing the number of moving parts.

Another object of the invention is to simplify the structure of the device.

According to a first aspect, the invention proposes an assembly for a turbomachine extending around an axis including:
  an inner annular platform and an outer annular platform delimiting a flow channel for a fluid circulating from upstream to downstream, and
  at least one fixed blade extending radially between the inner annular platform and the outer annular platform, said fixed blade being profiled with a leading edge,
  characterized in that the inner annular platform and/or the outer annular platform includes, upstream of the leading edge of the fixed blade, a furrow for channeling fluid circulating in the channel having a segment forming the upstream limit and a segment forming the downstream limit, the length of the upstream limit being greater than the length of the downstream limit.

The channeling furrow extends with a transverse dimension thinning downstream until a fixed blade so as to optimize the angle of attack of the flow relative to the leading edge of the blade.

The invention is advantageously completed by the following features, taken alone or in combination:
  the blade includes a camber line and in which the furrow includes a median line, the median line of the furrow extending in the continuation of the camber line of the blade;
  the downstream limit of the furrow is located downstream of the leading edge of the blade; this allows avoiding concentrating the flow on the leading edge and distributing it over an upstream portion of the blade;
  the blade comprises a maximum thickness in a transverse direction, the length of the upstream limit segment of the furrow being comprised between 150% and 400% of the maximum thickness of the blade, and the length of the downstream limit segment of the furrow being comprised between 80% and 120% of the maximum thickness of the blade;

the furrow has a profile including a first cross section of parabolic shape and a second cross section of sinusoidal shape; this allows the transverse cross section to have a large surface and thus to admit a greater flow, as well as having a depth h near the maximum depth of the transverse cross section over a large part of its width, moreover this allows avoiding sharp edges at the lateral limits of the furrow and thus limiting the phenomena of stress concentrations or of erosion;

a depth of the furrow is maximum at the first cross section, and decreases downstream, the second cross section being located in proximity to the leading edge of the blade and having a smaller depth than the depth of the first cross section;

the furrow includes a median longitudinal guide curve having an arc length comprised between 40% and 200% of the length of the chord of the blade; this allows straightening the flow while preserving the compactness of the turbine;

the furrow has, at its upstream limit, an angular opening greater than the range of variation of the angle of attack relative to the blades of the flow flowing in the flow channel; this allows straightening the flow regardless of the phase of operation of the turbomachine;

each blade has a pressure side and a suction side, and the furrow has at its downstream limit an angular opening corresponding to the relative inclination of the pressure side and of the suction side of the blade at the downstream limit of the furrow. This allows directing the flow so that it is tangent to the suction side and the pressure side of the blade and thus limiting aerodynamic flow separation along the blade.

According to a second aspect, the invention proposes a turbomachine including an assembly of this type.

PRESENTATION OF THE FIGURES

Other features and advantages of the invention will also be revealed by the description that follows, which is purely illustrative and not limiting, and must be read with reference to the appended drawings in which.

Figure 6A:
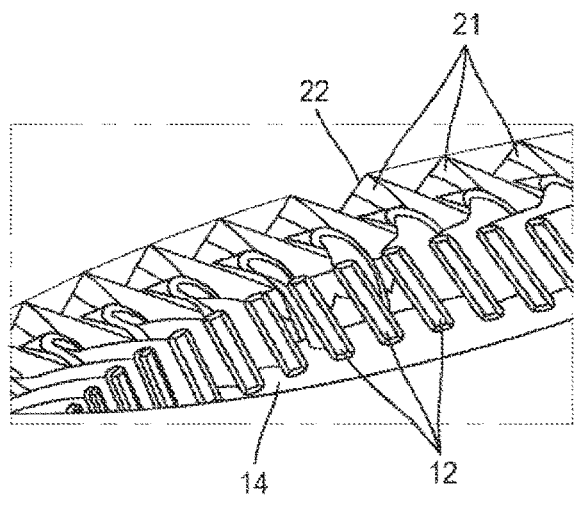
Figure 6B:
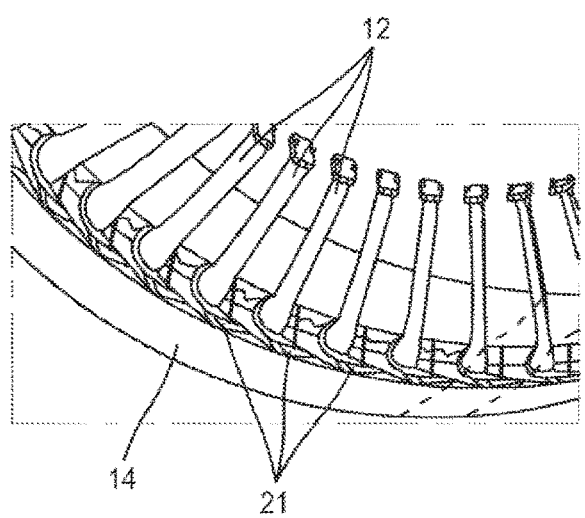

FIGS. 6a-6b area 3D views of a portion of a straightener or nozzle conforming to the invention; more precisely, FIG. 6a has a point of view oriented radially outward, FIG. 6b having a point of view oriented axially.

DESCRIPTION OF ONE OR MORE IMPLEMENTATION MODALITIES AND EMBODIMENTS

The embodiments described hereafter relate to a turbomachine stator, and are shown for the purpose of illustration.

In this description, the notions of upstream and downstream refer to the direction of flow of fluids in the turbomachine.

The notions of axial and radial refer to the geometry of the turbomachine 1 with axis X, a radial direction being understood to intersect and be orthogonal to the axis X of the turbomachine 1.

Figure 1:
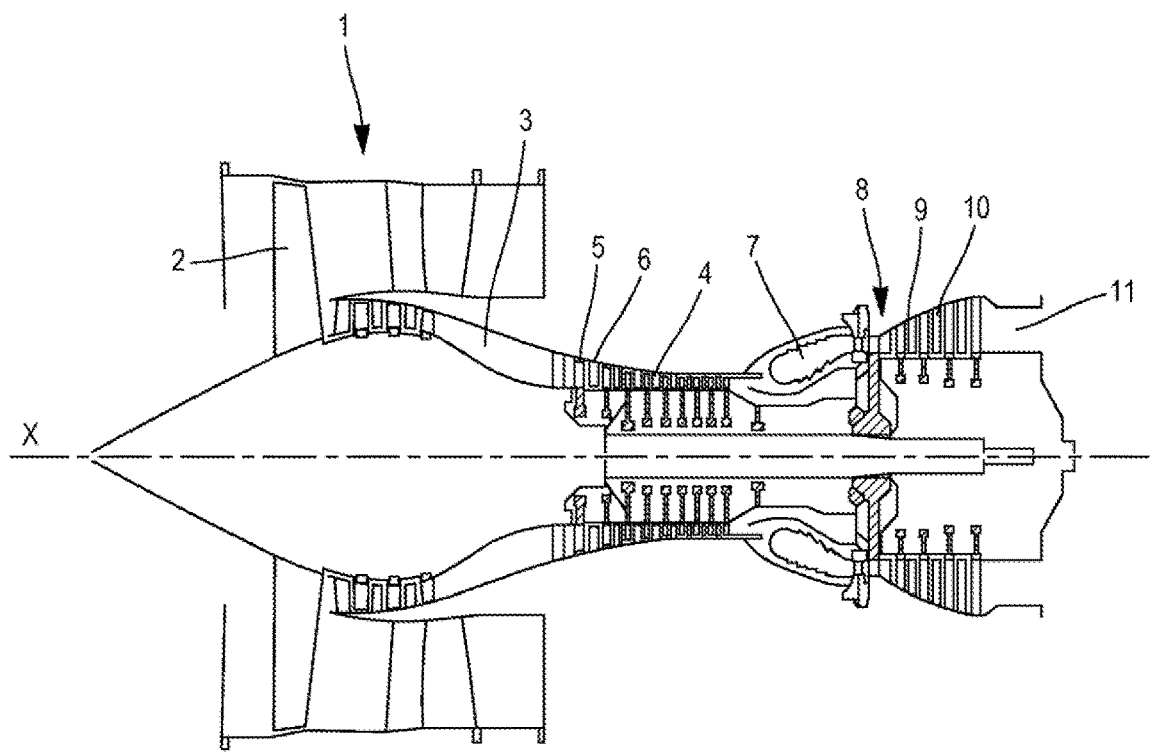
FIG. 1 is a profile section view of a prior art turbomachine.
Figure 2:
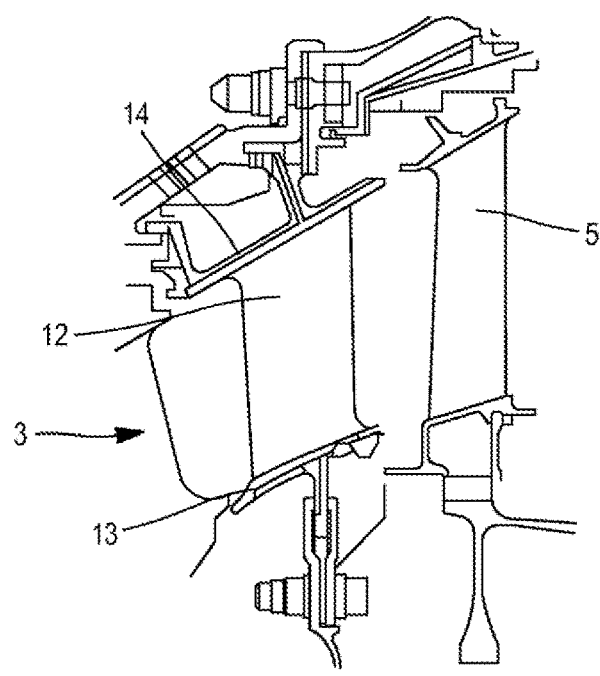
FIG. 2 is a partial profile section view of a stage of a turbine and of a nozzle.
Figure 3:
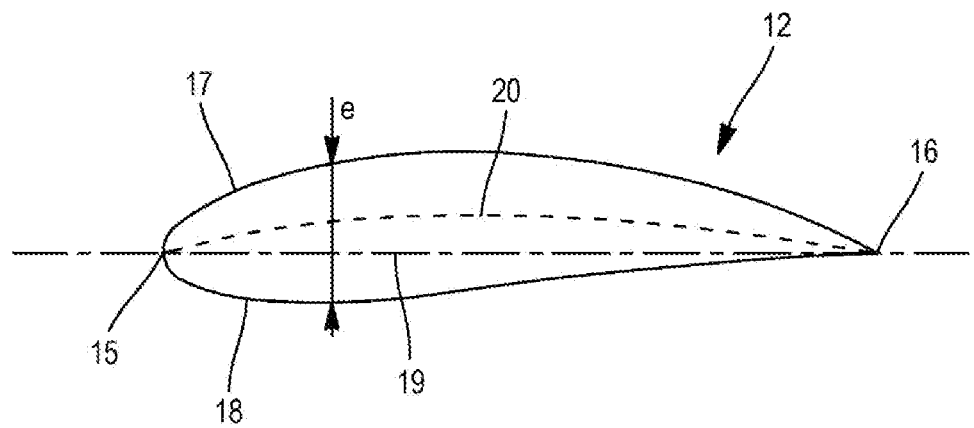
FIG. 3 is a schematic section view of a blade, detailing its geometric attributes.

With reference to FIG. 3, a blade 12 conventionally includes a leading edge 15 at its upstream end, a trailing edge 16 at its downstream end, a suction side 17 and a pressure side 18, a chord 19 passing through the leading edge 15 and the trailing edge 16 and defining a reference line allowing the expression of the pitch of the blade and the angle of attack of the gas flow on the blade, and a camber line 20 defining the profile of the blade 12.

The blade 12 has a variable thickness e, the thickness e of the blade 12 being the distance separating the suction side 17 and the pressure side 18 in a transverse direction relative to the chord 19 of the blade 12. What is meant by transverse direction relative to the chord 19 is a direction substantially orthogonal to the chord 19.

Figure 4:
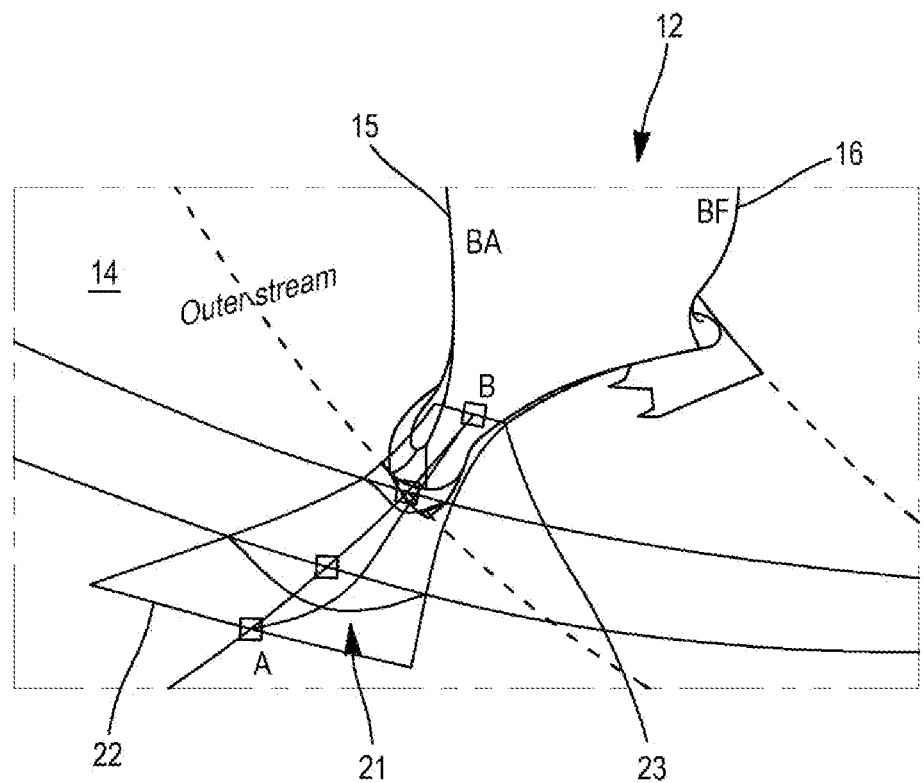
FIG. 4 is a 3D view of a blade including a redirection furrow conforming to the invention.

With reference to FIG. 4, the blade 12 extends radially toward the interior from the outer annular platform 14.

The outer annular platform 14 continues in an axial direction upstream of the blades 12.

Upstream of the blade 12, a depression forming a furrow 21 extending until the leading edge 15 of the blades 12 is provided on the outer annular platform 14, so as to modify the direction of the air flow upstream of the blade 12 and thus minimize the angle of attack of the air flow on the blade 12.

A furrow 21 includes an upstream limit 22, a downstream limit 23 and is delimited laterally by a lateral limit called the suction side 25, located in the continuation of the suction side 17 of the blade 12, and a lateral limit called the pressure side 26, located in the continuation of the pressure side 18 of the blade 12.

The furrow 21 extends from upstream to downstream while narrowing, having a large angular opening upstream which shrinks downstream, thus defining a furrow narrowing in the manner of a funnel and channeling the flow upstream of the leading edge 15 of the blade 12.

By angular opening is meant the angle defined by the tangents to the suction side 25 and pressure side 26 lateral limits on a cross section of the furrow 21, at the upstream limit 22 here. By cross section of the furrow is meant a section of the furrow 21 comprised in a plane normal to a median line 30 of the furrow 21.

The median line 30 of the furrow 21 is defined as a curve situated equidistantly from the suction side 25 and pressure side 26 lateral limits and situated at the same radius relative to the axis X of the turbomachine as the suction side 25 and pressure side 26 lateral limits.

The channeling furrow 21 includes an upstream limit 22 at which the angular opening of the furrow 21 is configured to correct the direction of the flow regardless of the operating speed of the turbomachine 1.

The angle of attack of the flow being a function of the rotation speed of the turbomachine 1, the angular opening of the channeling furrow 21 at the upstream limit 22 is configured in such a manner that it is at least as great as the angle formed by the extreme directions of flow, or to have an even greater angular opening.

A first extreme direction of the flow corresponds to the angle of attack of the flow at the lowest useful operating speed, a second extreme direction of the flow corresponding to the angle of attack of the flow at the highest useful operating speed.

The wider the range of operating speeds, the greater the range of variation of the angles of attack of the flow on the blades 12.

Conventionally, during a given flight phase, the direction of the flow is inclined by an angle of X° relative to the axis of the turbomachine. During another flight phase, the direction of the flow is inclined by an angle of Y° relative to the axis of the turbomachine.

During all the operating phases of the turbomachine, the flow directions of flow have an inclination comprised within the angular interval [X°;Y°].

It is therefore necessary, for the large ranges of variation that the furrow 21 has at its upstream limit 22, an angular opening at least equivalent to the range of variations of the angle of attack of the flow.

Concretely, the furrow 21 has, at its upstream limit 22, an angular opening of at least Y°-X°.

This allows the flow on the blade 21 to be correctly redirected regardless of the operating speed of the turbomachine 1.

The furrow 21 tightens downstream and its angular opening is continuously reduced, so as to modify the direction of the flow until it has an optimal angle of attack relative to the blade 12.

In this manner, the furrow 21 deflects the flow of gas upstream of the blade 12 and thus optimizes its angle of attack relative to the blade 12 regardless of the operating speed of the turbomachine 1.

This channeling of the flow allows the straightener 6 or the nozzle 10 to operate optimally at all useful operating speeds of the turbomachine 1 thereby obtaining an improved efficiency of the turbomachine 1, regardless of the operating speed, and further to smooth the disparities of efficiency according to the operating speeds.

In a turbomachine 1, this will have the effect of reducing the consumption of fuel of the engine during operation.

In a turbine or a hydraulic pump, this will have the effect of increasing the power transmittable between the fluid and the movable elements.

Optionally but advantageously, the furrow 21 has, at its downstream limit 23, an angular opening corresponding to the relative inclination of the pressure side 18 and of the suction side 17 of the blade 12 at the downstream limit 23 of the furrow 21.

This favors the deflection of the flow upstream of the blade 12 so that the flow is tangent to the pressure side 18 and the suction side 17 of the blade 12, which allows limiting the phenomena of flow separation at the blades 12. The deflection of the flow by the blades 12 is thereby greatly improved.

The deflection 21 can also be configured to allow increasing the maximum operating speed of the compressor 4 or of the turbine 8.

In fact, this maximum speed is defined by a maximum angle of attack causing a flow separation of the straighteners 6 or nozzles 10, nullifying their effect. This maximum angle of attack is caused by the deflection of the flow caused by the compressor 5 or turbine 9 rotors when they operate at high speed.

The channeling of the flow upstream of the straighteners 6 or nozzles 10 allows reducing the angle of attack and increasing the operating speed of the compressor 4 or of the turbine 8 causing the flow separation of the straighteners 6 or distributors 10.

In a turbomachine 1, this causes an increase in the maximum power of the engine and therefore an increase in the performance of the aircraft on which it is installed.

In a pump or in a hydraulic turbine, this allows increasing the allowable flow rate, and therefore the power transmittable or obtainable between the fluid and the machine.

Figure 5:
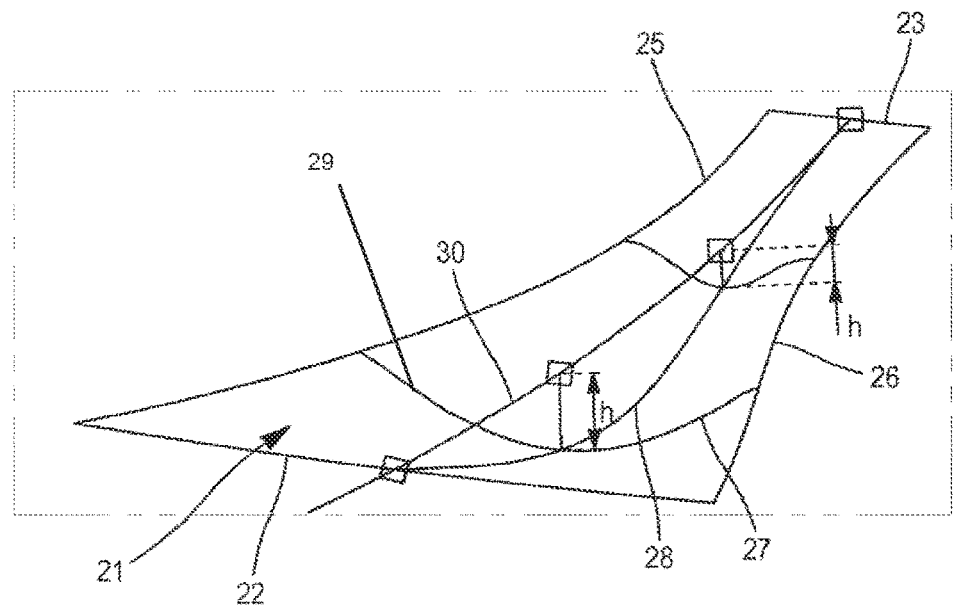
FIG. 5 is a 3D sketch highlighting the geometric elements of the redirection furrow.

With reference to FIG. 5, the furrow 21 includes a downstream limit 23, a plurality of longitudinal guide curves 24 extending from the upstream limit 22 to the downstream limit 23 and defining the shape of the furrow 21.

A longitudinal guide curve 24 is defined as being the shortest curve extending from a point of the upstream limit 22 to the downstream limit 23 while following the points of the surface of the furrow 21 located at the same relative distance from the pressure side 25 and suction side 26 lateral limits.

The furrow 21 can also be described by a lateral limit called the section side 25 and a lateral limit called the pressure side 26 extending from a first (respectively second) end of the upstream limit 22 to a first (respectively second) end of the downstream limit 23 and laterally delimiting the furrow 21. Transverse guide curves 27 extend from the suction side lateral limit 25 to the pressure side lateral limit 26.

A transverse guide curve 27 is defined as the shortest curve extending from a point of one among the suction side and pressure side lateral limit to the other among the pressure side and suction side while following the profile of the furrow 21.

A median longitudinal guide curve 28 can be defined as the longitudinal guide curve passing through the middle of the upstream limit 22 and the middle of the downstream limit 23.

The median longitudinal guide curve 28 has an arc length comprised between 40% and 200% of the length of the chord 19 of the blade 12. This allows in particular straightening the flow while preserving the compactness of the turbine.

By chord 19 of the blade 12 is conventionally meant the distance between the leading edge 15 and the trailing edge 16 of the blade 12.

As the furrow 21 is being produced on a substantially cylindrical surface with axis X, it has a depth h defined at any point of the furrow 21 as the distance along a radial direction between the point of the furrow and the cylindrical surface on which the furrow 21 is produced.

The depth h of the furrow 21 is zero at the upstream limit 22, increases until a first plane 29 passing through a transverse guide curve. At this first plane 29, the transverse guide curve is of parabolic shape. This type of profile allows in particular having a depth near the maximum depth over a large surface of the cross section, in order to improve the capture of the flow by the furrow.

The depth h is a maximum at the first plane 29 and diminishes downstream to a zero value at the downstream limit 23.

A second transverse guide curve downstream of the first plane 29 has for example a sinusoidal shape.

This type of profile allows avoiding sharp edges at the lateral limits of the furrow 21 and thus limiting the phenomena of stress concentration or of erosion. This further allows the transverse cross section to have a large surface and thus to admit a greater flow, as well as having a depth h near the maximum depth of the transverse cross section over a large part of its width.

The different geometric components defining the surfaces of the furrow 21 are generated by means of splines. The different longitudinal guide curves are defined by means of splines. What is conventionally meant by a spline is a piecewise function defined by polynomials.

With reference to FIG. 6a, a row of blades 12 extends radially inward from the outer annular platform 14.

Each of the blades 12 has a furrow 21 upstream of its leading edge 15.

The median longitudinal guide curve 28 of a furrow 21 extends the camber line 20 of the blade 12 upstream of which the furrow 21 is located.

The suction side 25 and pressure side 26 lateral limits can be straight or curved, stemming from the interval of angles of attack caused by the interval of operating speeds of the turbomachine.

In this embodiment, the downstream limit 23 of the furrow 21 is located downstream of the leading edge 15 of the blade 12, the furrow 21 therefore having a nonzero depth h at the leading edge 15. The plane passing through the second, sinusoidal transverse guide curve passes through the leading edge of the blade. This allows in particular avoiding concentrating the flow on the leading edge and to distribute it over an upstream portion of the blade. The incident flow is distributed over a portion representing 5 to 15% of the pressure/suction side.

In the embodiment illustrated in FIG. 6b, the furrows 21 are produced on the outer annular platform 14.

In fact, the speed of a point of a movable blade 5, 9 being proportional to its distance relative to the axis of rotation X, the deflection of the flow, and consequently the angle of attack of the flow on the straighteners 6 or nozzles 10, is much greater at the radially outer annular platform 14.

It is however possible to produce furrows 21 on the radially inner annular platform 13.

The angular opening of a furrow 21 produced on a radially inner annular platform 13 can be smaller than the angular opening of a furrow 21 produced on a radially outer annular platform 14.

It is also possible, in one variant, to produce this type of furrow 21 upstream of a movable blade.

The production of flow channeling upstream of the straighteners 6 or nozzles 10 by immobile furrows 21 allows greatly simplifying the structure of the turbomachine 1 on which the device is installed.

In fact, the absence of a control and actuation system greatly reduces the cost and the complexity of the maintenance operations, and also allows greatly simplifying the architecture of the engine and its assembly. This is the case for example in an application of the invention to a compressor or to a secondary flow straightener downstream of the fan.

The channeling furrows 21 further allow containing the mass of an annular platform, in such a manner that the annular platform is virtually equivalent, whether it is equipped with the device or not.

The invention claimed is:

1. An assembly for a turbomachine,
the assembly extending around an axis,
the assembly including:
an inner annular platform and an outer annular platform, the inner annular platform and the outer annular platform delimiting a flow channel for a fluid circulating from upstream to downstream; and
at least one fixed blade extending radially between the inner annular platform and the outer annular platform, the fixed blade being profiled with a leading edge,
wherein the inner annular platform and/or the outer annular platform includes, upstream of the leading edge of the fixed blade, a furrow for channeling fluid circulating in the flow channel,
the furrow having a segment forming an upstream limit and a segment forming a downstream limit,
a length of the upstream limit being greater than a length of the downstream limit, and
wherein the furrow has a profile including a first cross section of parabolic shape and a second cross section of sinusoidal shape.

2. The assembly for a turbomachine according to claim 1,
wherein the blade includes a camber line, and
wherein the furrow includes a median line,
the median line of the furrow extending in a continuation of the camber line of the blade.

3. The assembly for a turbomachine according to claim 2, wherein the downstream limit of the furrow is located downstream of the leading edge of the blade.

4. The assembly for a turbomachine according to claim 1,
wherein the blade comprises a maximum thickness in a direction,
transverse with respect to a chord line of the blade,
the length of the upstream limit being comprised between 150% and 400% of the maximum thickness of the blade, and
the length of the downstream limit being comprised between 80% and 120% of the maximum thickness of the blade.

5. The assembly for a turbomachine claim 1,
wherein the first cross section has a depth which is a maximum depth of the furrow,
the furrow having a depth that decreases downstream of the first cross section,
the second cross section being located in proximity to the leading edge of the blade and having a smaller depth than the depth of the first cross section.

6. The assembly according to claim 1, wherein the furrow includes a median longitudinal guide curve having an arc length comprised between 40% and 200% of a length of a chord of the blade.

7. The assembly according to claim 1, wherein the furrow has, at the upstream limit, an angular opening greater than a range of variation of an angle of attack relative to the blades of the flow flowing in the flow channel.

8. The assembly according to claim 1,
wherein each blade has a pressure side and a suction side; and
wherein the furrow has at the downstream limit an angular opening corresponding to a relative inclination of the pressure side and of the suction side at the downstream limit.

9. A turbomachine including the assembly according to claim 1.

* * * * *